(12) United States Patent
Lyman (10) Patent No.: US 7,401,052 B2
(45) Date of Patent: *Jul. 15, 2008

(54) METHOD FOR VALIDATING WARRANTY COMPLIANCE AND INK COMPATIBILITY ASSURANCE

(75) Inventor: Dan C. Lyman, Cincinnati, OH (US)

(73) Assignee: Eastman Kodak Company, Rochester, NY (US)

( * ) Notice: Subject to any disclaimer, the term of this patent is extended or adjusted under 35 U.S.C. 154(b) by 512 days.

This patent is subject to a terminal disclaimer.

(21) Appl. No.: 10/839,617

(22) Filed: May 5, 2004

(65) Prior Publication Data

US 2005/0251480 A1    Nov. 10, 2005

(51) Int. Cl.
*H04K 1/00* (2006.01)
*H04L 9/00* (2006.01)
*G06Q 10/00* (2006.01)
*G06Q 30/00* (2006.01)

(52) U.S. Cl. .............. 705/50; 705/1; 705/77; 347/7; 347/19; 347/106

(58) Field of Classification Search .............. 705/1, 705/77; 347/7, 19, 106
See application file for complete search history.

(56) References Cited

U.S. PATENT DOCUMENTS

| | | | |
|---|---|---|---|
| 5,365,312 A | 11/1994 | Hillmann et al. | |
| 5,473,350 A * | 12/1995 | Mader et al. | 347/7 |
| 6,062,669 A | 5/2000 | Lee | |
| 6,094,639 A * | 7/2000 | Kubota | 705/1 |
| 6,116,715 A | 9/2000 | Lefebvre et al. | |
| 6,155,664 A * | 12/2000 | Cook | 347/7 |
| 6,158,837 A | 12/2000 | Hilton et al. | |
| 6,447,090 B1 * | 9/2002 | Saruta | 347/19 |
| 6,670,022 B1 * | 12/2003 | Wallace et al. | 428/156 |
| 6,820,064 B1 * | 11/2004 | Currans et al. | 705/77 |
| 2001/0007458 A1 | 7/2001 | Purcell et al. | |
| 2003/0160839 A1 | 8/2003 | Kosugi | |
| 2004/0004653 A1 * | 1/2004 | Pryor et al. | 347/106 |

FOREIGN PATENT DOCUMENTS

EP    0 903 237    3/1999

* cited by examiner

*Primary Examiner*—Andrew J. Fischer
*Assistant Examiner*—Cristina Owen Sherr
(74) *Attorney, Agent, or Firm*—Buskop Law Group, PC (57) ABSTRACT

A method for validating warranty compliance for compatible fluid use of a printing system entails fluidly engaging a replaceable fluid container with a print station. The container includes a smart card adapted to track volumetric credits. Through use, the print station requests that fluid be added to a reservoir from the container. The method continues by ascertaining the presence of the smart card in the reader/writer and reading the smart card to obtain information related to the fluid. The print station operates per the information from the smart card. The method ends by ascertaining the amount of fluid amount removed from the container and writing the withdrawn amount to the smart card as a debit, thereby maintaining printhead operation under warranty.

58 Claims, 10 Drawing Sheets

METHOD FOR VALIDATING WARRANTY COMPLIANCE AND INK COMPATIBILITY ASSURANCE

REFERENCES TO RELATED APPLICATIONS

FIELD OF THE INVENTION

The present embodiments relate to a method for affecting an ink compatibility assurance program.

BACKGROUND OF THE INVENTION

Current ink jet printing systems consist of a fluid system supporting one or more printheads. Typical ink jet printheads operate by forcing fluid through a droplet generator that contains an array of orifices, forming droplets of ink. The type of ink used in the printhead is important; the type of ink used will enhance overall reliability of the system or cause the printhead to fail.

In continuous ink jet printing systems, ink parameters are finely tuned to work in conjunction with the printhead portion of the system. The use of an ink that is not certified to work with a particular system can adversely affect the quality of printing, the frequency of print systems errors, and/or the longevity of print system components.

Since a printhead may be considered a high cost consumable element in the printing system, it is often warranted by the manufacturer to meet certain reliability criteria and, therefore, the manufacturer often ends up absorbing the large cost of a customer's use of non-approved ink in a print system. This is an expense that manufactures desire to avoid.

Typically, the customer purchases the system with the agreement that the customer must use approved ink. For various reason (i.e., low cost, better short term performance at the expense of reduced printhead life, availability of a specific color, and the like) a customer may be tempted to use non-approved ink.

A need exists for a method to track the consumption of ink or other fluids by an ink jet printing system. If non-approved ink is being used by the customer, a need exists for a method to let the manufacturer know that the conditions of the warranty have been violated.

Hillmann U.S. Pat. No. 5,365,312 discloses a technique for tracking the use of replaceable ink reservoirs, toner cartridges, and ribbon cassettes by permanently modifying the electronic memory associated with these devices. A drop counting technique is used to determine usage and misusage of ink.

Other system for detecting ink cartridge status are known in the art, as exampled by Hilton U.S. Pat. No. 6,158,837, Lefebvre U.S. Pat. No. 6,116,715; Lee U.S. Pat. No. 6,062,669. The prior art listed herein is hereby incorporated by reference.

A need exists for a method that allows the customer to continue to operate while alerting the printhead manufacturer that non-approved ink is being used.

The embodied methods herein are designed to meet these needs.

SUMMARY OF THE INVENTION

A method for validating warranty compliance for compatible fluid use of a printing system entails fluidly engaging a replaceable fluid container with a print station. The container includes a smart card adapted to track volumetric credits. Through use, the print station requests that fluid be added to a reservoir from the container. The method continues by ascertaining the presence of the smart card in the reader/writer and reading the smart card to obtain information related to the fluid. The print station operates per the information from the smart card. The method ends by ascertaining the amount of fluid amount removed from the container and writing the withdrawn amount to the smart card as a debit, thereby maintaining printhead operation under warranty.

Embodied methods for validating warranty compliance of using replaceable fluids with print stations pertain to situations wherein a smart card is not present, wherein low volume or a zero volume exists on the smart card, wherein the print station cannot read the information on the smart card, wherein the fluid in the container had passed an expiration date, and wherein the fluid in the container is incompatible with the fluid in the print station.

BRIEF DESCRIPTION OF THE DRAWINGS

In the detailed description of the preferred embodiments presented below, reference is made to the accompanying drawings, in which.

The present embodiments are detailed below with reference to the listed Figures.

DETAILED DESCRIPTION OF THE INVENTION

Before explaining the present embodiments in detail, it is to be understood that the embodiments are not limited to the particular descriptions and that it can be practiced or carried out in various ways.

The embodied methods provide a secure way of determining when a customer has used non-approved ink in a continuous ink jet printing, system. The methods provide a manner of relating this information to the printhead manufacturer using the printhead memory.

Figure 1:
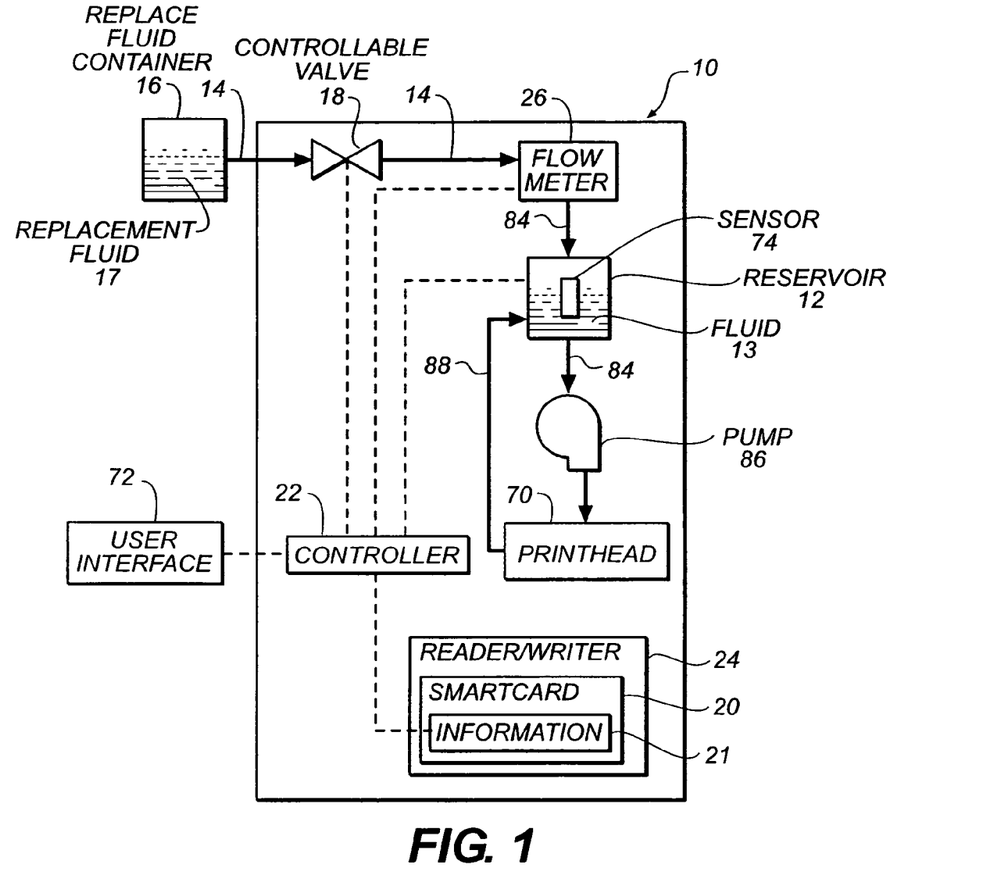
FIG. 1 depicts an overall schematic of a printing system and a smart card.

The embodied methods are preferably used on an ink jet print. FIG. 1, FIG. 2, FIG. 3, and FIG. 4 depicts an exemplary system on which the methods can be used. FIG. 1 depicts an ink jet print station 10, such as a Kodak Versamark DT92 print station available from Kodak Versamark of Dayton, Ohio.

The print station has a printhead 70 connected to a reservoir 12 for holding fluid 13 usable by the print station for cleaning or for printing.

A fluid supply line 14 communicates with the reservoir 12 and a replaceable fluid container 16. The replaceable fluid container 16 can hold fluid for the print station. The fluid 17 can be ink, cleaning fluid, a replenishment fluid or combinations of these fluids.

A controllable valve 18 is disposed in the fluid supply line 14 for controlling fluid flow through the fluid supply line 14. The controllable valve is operated by a controller 22 that in turn receives information from a reader/writer 24. The smart card 20 has information 21 concerning the replaceable fluid container 16. The information on the smart card 20 can be read by the reader/writer 24. After the controller 22 has received information from the smart card 20, the controller can provide a controlled release of fluid 13 from the replaceable container 16 to the reservoir.

A flow meter 26 can optionally be disposed in the fluid supply line 14 and be in communication with the controller 22.

The print station can have a user interface 72 in communication with the controller 22 enabling the controller 22 to advise a user that the fluid in the reservoir is not compatible with the print station. The print station can advise a user that a valid smart card with volume remaining on the card is in use. The print station can provide other messages as well, such as messages that the new ink of a second replaceable container is not compatible with the ink of the reservoir or that flushing needs to occur prior to use of the new ink of the second replaceable container. Other example messages the print station can provide include a message that the expiration date for fluid in the replaceable container has passed, a message that a smart card has not been installed, and a message that the smart card volumetric credits are low.

The print station has a sensor 74 for measuring the level of fluid in the container that is in communication with the controller.

The print station has a fluid line 84 connected between the reservoir to the printhead. A pump 86 is disposed in the fluid line to supply fluid from the reservoir to the printhead. Additionally, the print station has a fluid return line 88 from the printhead to the reservoir.

An example of a smart card usable with the print station is model MPCOS-EMV16K available from GemPlus of Luxembourg. An exemplary smart card reader for reading from and writing to the smart card is model 410 available from GemPlus of Luxembourg. The smart card preferably is one that complies with the ISO standard ISO 7816.

The controller can be a central processing unit (CPU) or a gate array logic device. The controller can conjunctively operate the print station. The gate array logic device can be a model Spartan XC2S100E available from Xilinx.

The reservoir 12 can have a capacity between one liter and six liters. It is envisioned that the replaceable container can have capacity between 1 liter and 220 liters.

The fluid of the reservoir or the replaceable fluid container can be water-based ink, oil-based ink, solvent-based ink, cleaning fluid, replenishment fluid, or a toner. An example of an ink that could be used in the print station is model FD7101 from Kodak Versamark of Dayton, Ohio. An example of a cleaning fluid is model FF5000 from Kodak Versamark. An example of a replenishment fluid is product number FR1014 from Kodak Versamark.

The fluid supply line can be flexible tubing having an inner diameter between 0.25 cm and 2.5 cm, which is compatible with the fluid.

The controllable valves are preferably motor valves, solenoid valves, hydraulic valves, pneumatic valves, or other electrically controlled valves.

Figure 2:
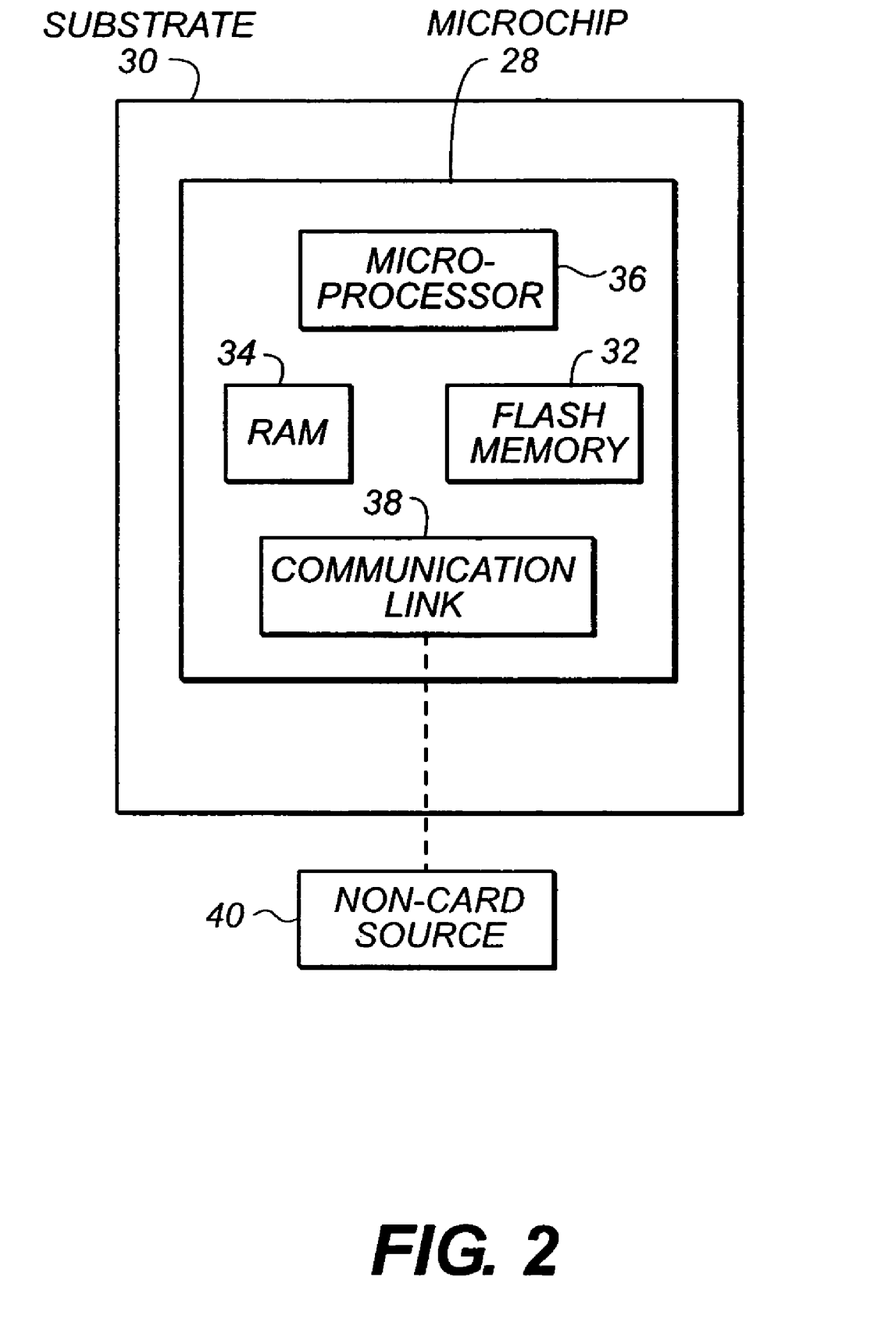
FIG. 2 depicts a representative view of the components of the smart card.

FIG. 2 depicts a preferred embodiment of a smart card usable in the print station. The smart card includes a microchip 28 embedded in a substrate 30, wherein the microchip has flash memory 32, random access memory (RAM) 34, a microprocessor 36, and a communication link 38 for transmitting and receiving data from a non-card source 40.

Figure 3:
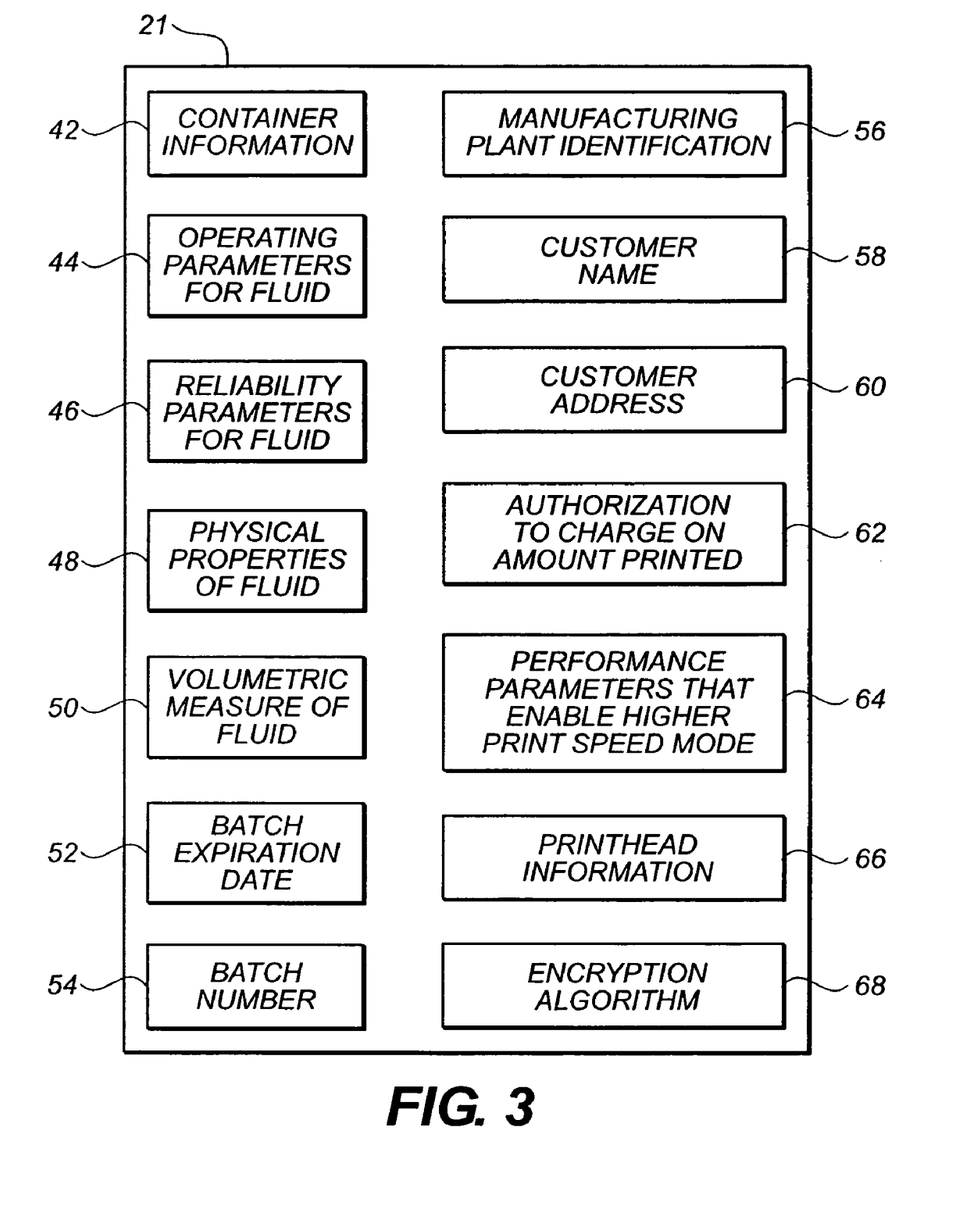
FIG. 3 depicts a graphic representation of the data fields that can be stored on the smart card.

FIG. 3 shows the smart card with the following information stored on the card, information about the container 42, operating properties of the fluid 44, reliability properties of the fluid 46, specifications on the physical properties of fluid in the container 48, volumetric measurements on the fluid in the container 50, batch expiration dates 52, batch number 54, manufacturing plant identification information 56, customer name 58, customer address 60, authorization to charge based on amount printed 62, performance parameters that enable the system run faster for a defined period of time 64, printhead information 66. The smart card can also include a security encryption algorithm 68 to prevent unauthorized communication with the smart card.

Figure 4:
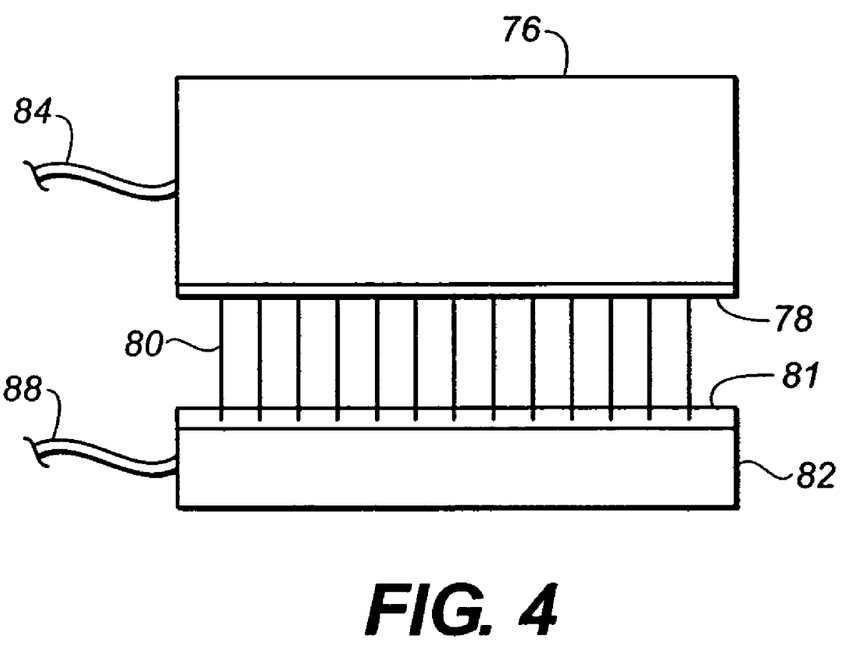
FIG. 4 depicts a printhead that operates within the print station of the device

FIG. 4 shows an embodiment of an ink jet printhead usable in these methods, more specifically a drop generator 76 has an orifice structure 78 attached to the drop generator forming a jet array 80. Disposed opposite the jet array is an optional charge device 81 connected to a catcher 82. The drop generator is supplied with fluid from a fluid line 84. The catcher 82 communicates to a fluid return line 88 to return fluid from the catcher to the reservoir 12.

Often, if a customer uses ink that is not approved by a manufacturer, the life of the printhead is reduced and/or the printhead can be damaged and ultimately non-refurbishable, which is wasteful for recycling and environmental purposes. This inventive method provides a feature of tracking ink usage to prevent printhead damage.

If the wrong ink is used in the printing device, the device can completely break down or fail because other parameters for the printing machine have not been reset due to the use of the wrong ink. The present device and method were designed to maximize the longevity and reduce repair needs for a printing system. When customers use appropriate inks, the warranty can extend for the full duration of the intended period, which creates a positive customer-manufacturer relationship. Use of a smart card assists in maximizing the warranty relationship by helping insure the tracking of ink usage to a system.

The methods additionally minimize the extent to which a manufacturer is financially exposed when a customer damages a printhead by using uncertified competitor inks and returns the printhead to the manufacturer for replacement.

Figure 5:
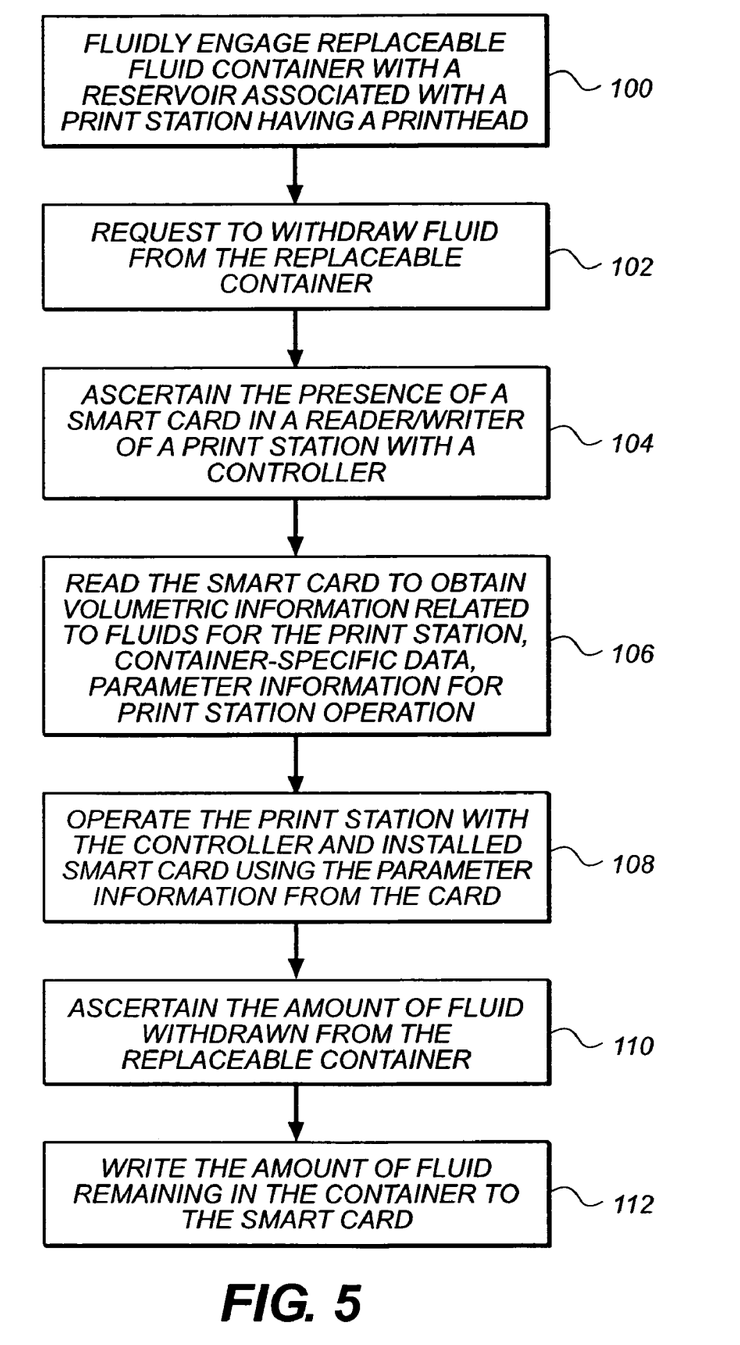
FIG. 5 depicts a flow chart of the sequence of steps in an embodied method for validating warranty compliance for compatible fluid use of a printing system.

With reference to the figures, FIG. 5 depicts a method for using a smart card with a replaceable fluid container for an ink jet printing system. This method is used for validating warranty compliance for compatible fluid use of a printing system. The method entails fluidly engaging a replaceable fluid container associated with a print station (Step 100). The replaceable fluid container contains fluid and contains an associated removable smart card. The smart card is adapted to track volumetric credits.

During use of the print station, fluid is used. When the fluid falls below a preset level, fluid is withdrawn from the replaceable fluid container to the print station (Step 102). The request for fluid from the replaceable fluid container occurs when the print station is in a state that permits filling of the replaceable fluid container, such as a standby mode.

The print station ascertains whether the smart card is present by using a reader/writer (Step 104). The print station can ascertain the presence of the smart card by determining if a communication link exists between the smart card and the controller.

The controller reads the smart card to obtain information related to the fluid. The information includes volumetric information, fluid specific data, print station operation parameter information, and combinations thereof (Step 106). The print station performs operations based upon the information obtained from the smart card (Step 108).

Volumetric information includes the volume of ink or fluid or replenishment liquid in the replaceable fluid container. Fluid specific data includes ink expiration dates, ink batch number, another fluid number if a cleaning fluid or replenishment fluid is used. Parameter information includes operating temperature for the ink, specific state tables to use when operating the printhead, temperature correction coefficients for stimulation and charge voltages that are applied to the charge device that is an optional part for the catcher assembly, short detection limits, short detection delays, and similar operating conditions.

The smart card of the replaceable fluid container has stored in memory the specifications on the fluid for use in the printing system and the volume of fluid initially in the replaceable fluid container. Other information is also stored on the smart card, including particular user information, user biometrics optionally, and other user identifying codes. Security and encryption features can be on the smart card as well. The smart card can have a financial feature of indicating the amount of credit a customer has that can be debited from as the customer uses the fluid from the replaceable fluid container for the printing system.

Continuing with FIG. 5, the amount of fluid amount withdrawn from the replaceable fluid container is calculated (Step 110). The withdrawn fluid amount removed can be calculated by using a flow totalizer and a flow meter to measure a flow rate from the replaceable fluid container. The flow meter and controller integrate the flow rate over time to derive a total flow volume. The amount of fluid withdrawn from the replaceable fluid container can be calculated using other methods, such as a float switch, a pressure transducers, ultrasonic measurement, or optic measurement.

The method ends by withdrawing the fluid amount from smart card using the reader/writer by debiting the fluid amount the smart card, (Step 112), thereby maintaining printhead operation under warranty.

Operating the print station refers to the condition of running fluid through the printhead and fluid assembly, such as printing images with ink or cleaning the orifice structure with a cleaning fluid.

Alternatively, the methods can include linking the print station and smart card to a website to provide real time reports on a customer or providing a link from the smart card to a customer ordering site that enables fluid to be automatically refilled. The method can include initiating a customer service call to the customer when a warranty breach occurs.

Figure 6:
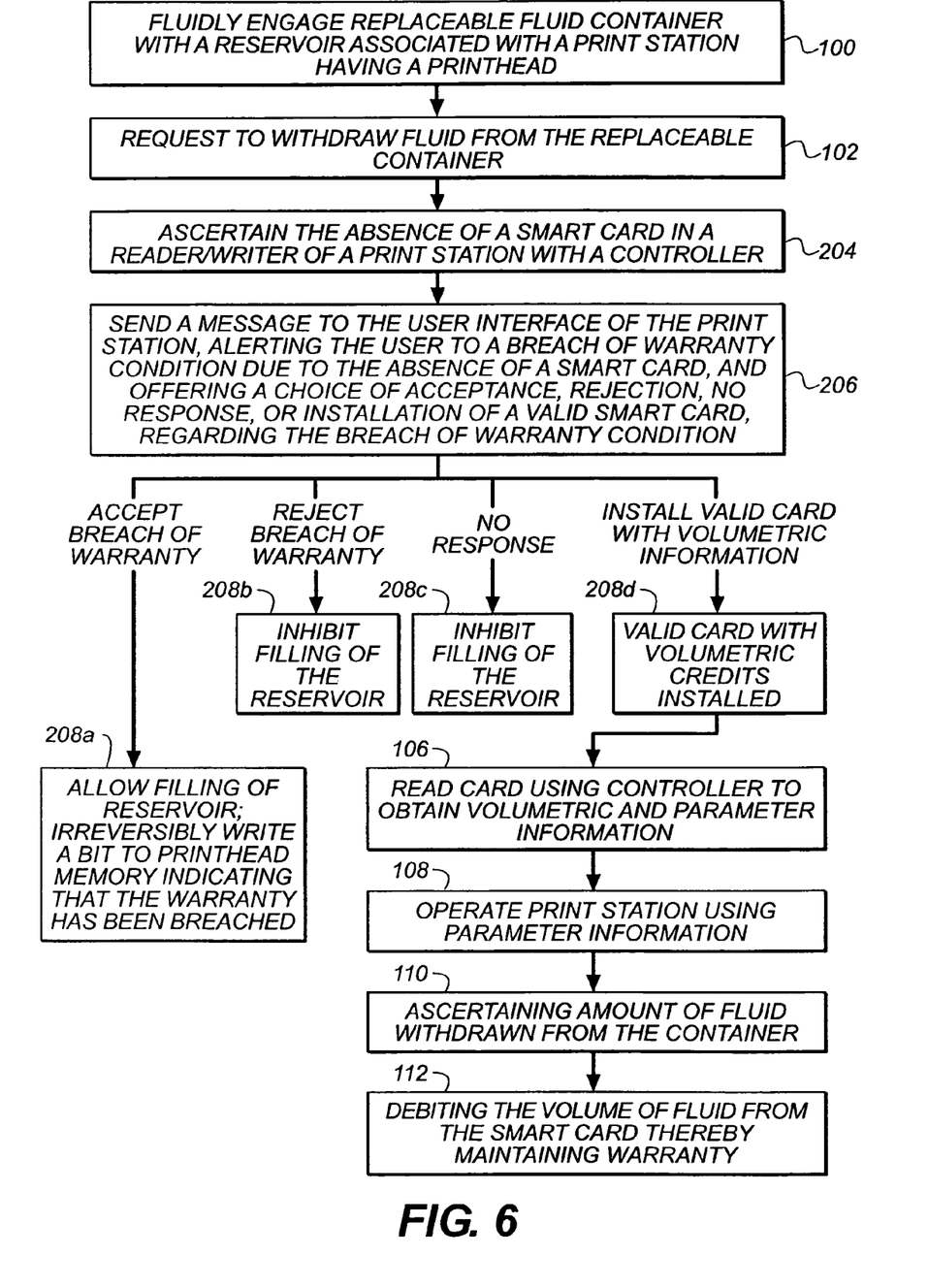
FIG. 6 depicts a flow cart of the sequence of steps in an embodied method for validating warranty compliance for compatible fluid use of a printing system.

FIG. 6 depicts the embodiment of the method, wherein the smart card is not present. Once the print station has ascertained that the smart card is absent (Step 204), the print station sends a message to a user interface alerting the user of a warranty breach condition since the smart card is absent (Step 206). The print station offers the user at least the following choices: acceptance, rejection, no response, or installation of a smart card regarding the warranty breach condition (Step 208).

If the acceptance choice is selected, the reservoir is filled with fluid from the replaceable fluid container and a message indicating a warranty breach occurred is transmitted to the printhead. The message on the printhead cannot be reset or erased (Step 208a). If the rejection choice is selected or if no response is given, the fluid flow to the reservoir is restricted (Step 208b or Step 208c).

If the user installs a valid smart card to avoid a warranty breach (Step 208d), the print station utilizes steps for validating warranty compliance for compatible fluid as depicted in FIG. 5.

Figure 7:
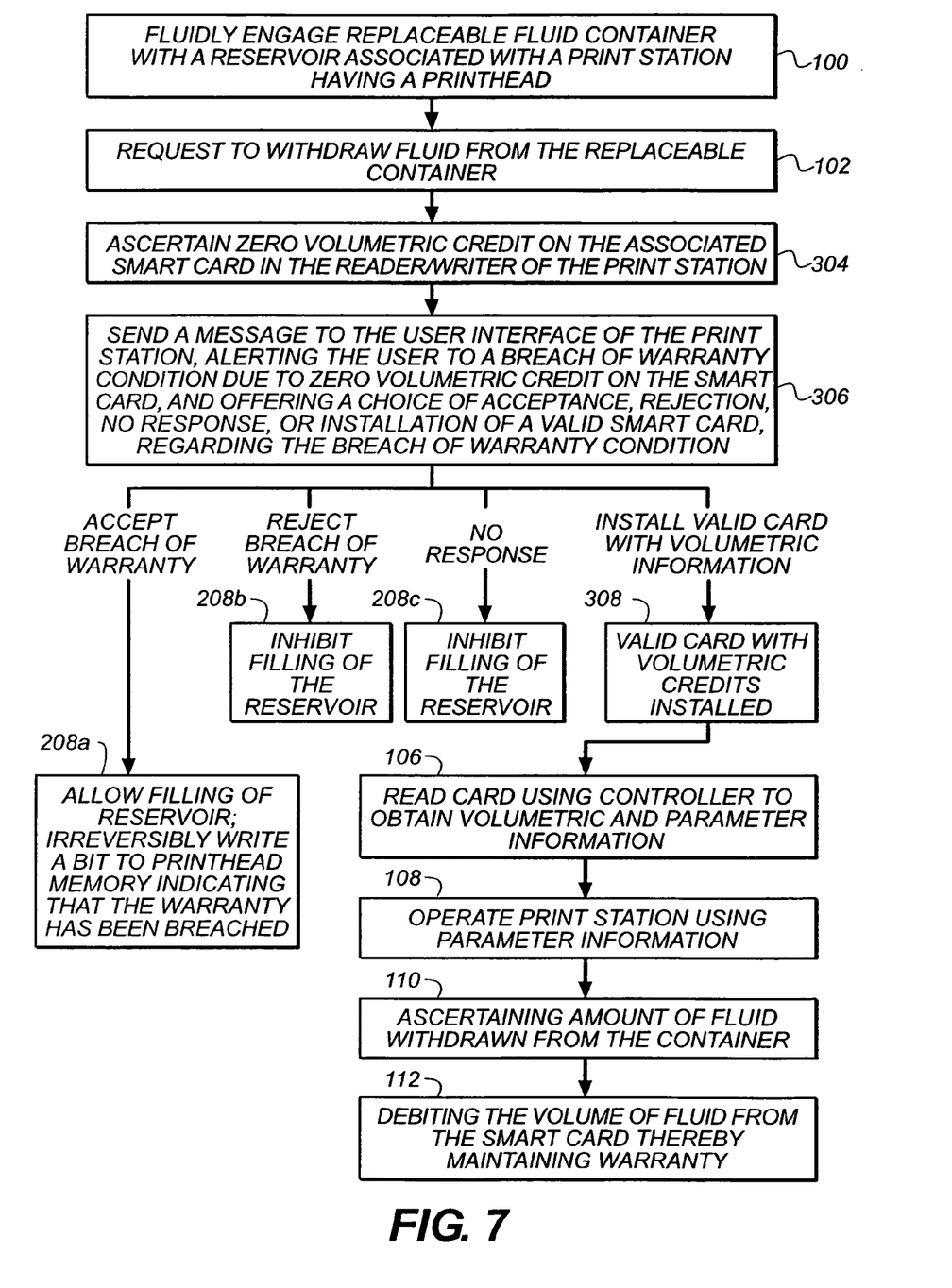
FIG. 7 depicts a flow cart of the sequence of steps in an embodied method for validating warranty compliance for compatible fluid use of a printing system.

FIG. 7 depicts embodiment of the preferred method, wherein the information on the smart card alerts the user that a low volume exists on the card. Once the print station determines that the smart card contains a zero volumetric credit (Step 304), the print station alerts the user that a warrant breach condition exists because of the zero volumetric credit (Step 306). The print station offers the user at least the following choices: acceptance, rejection, no response, or installation of a smart card regarding the warranty breach condition (Step 208).

If the acceptance choice is selected, the reservoir is filled with fluid from the replaceable fluid container. A message is also transmitted to the printhead that cannot be reset or erased. The message indicates that a warranty breach occurred (Step 208a). If the rejection choice is selected or if no response is given, the fluid flow to the reservoir from the replaceable fluid container is restricted (Step 208b or Step 208c).

If the user installs a valid smart card with volumetric credits to avoid a warranty breach (Step 308), the print station utilizes steps for validating warranty compliance for compatible fluid as depicted in FIG. 5.

Figure 8:
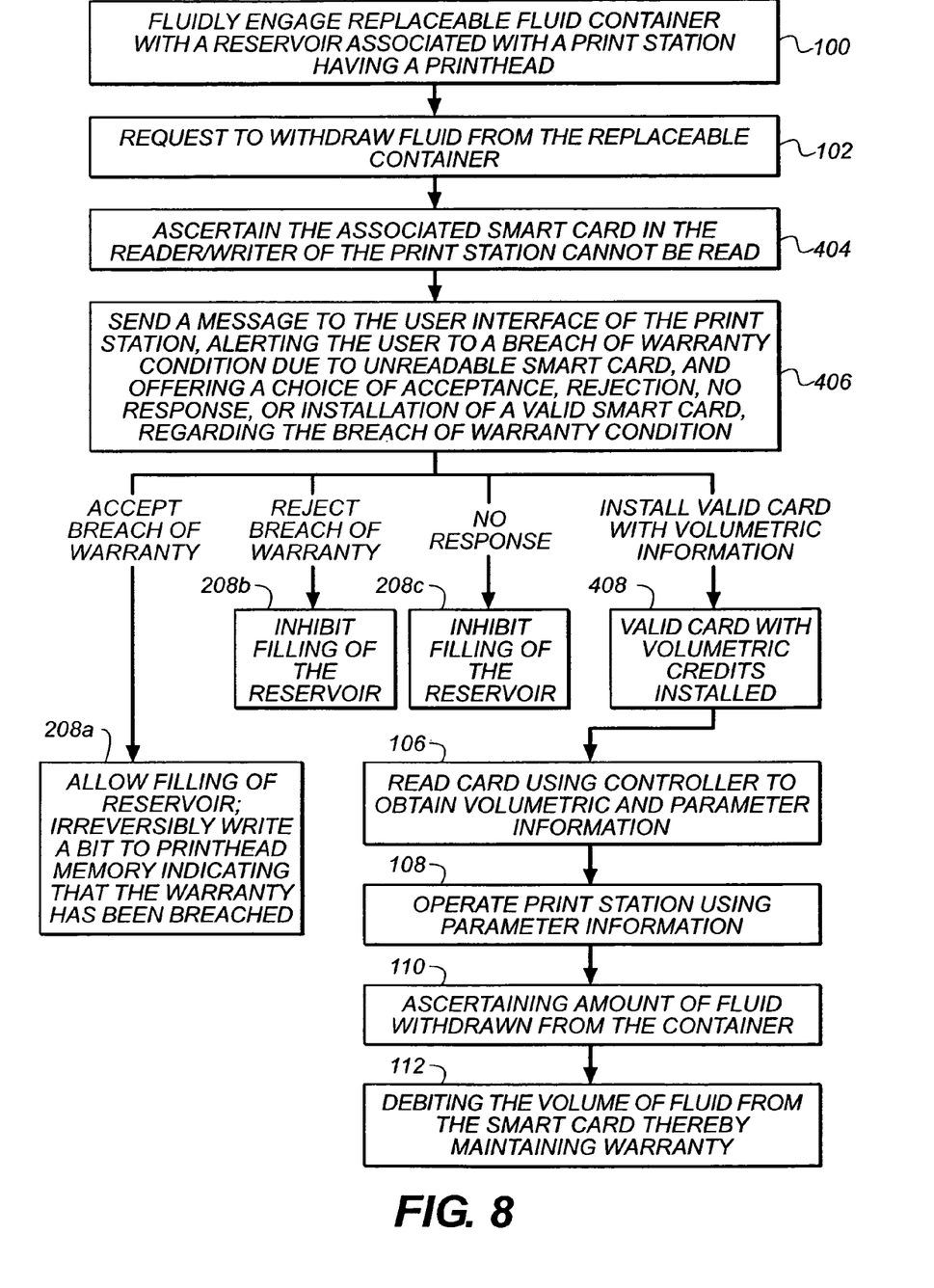
FIG. 8 depicts a flow cart of the sequence of steps in an embodied method for validating warranty compliance for compatible fluid use of a printing system.

Another embodied method, as depicted in FIG. 8, handles the situations when the smart is unreadable. After the replaceable fluid container has been inserted with an associated smart card (Step 100) and during printing operations, fluid is withdrawn from the replaceable fluid container to the print station (Step 102). The print station then ascertains whether the smart card is readable or not (Step 404). When the smart card is not readable by the reader/writer, the print station sends a message to the user through the user interface alerting that a warranty breach condition exists since the smart card is unreadable (Step 406). The print station offers the user at least the following choices: acceptance, rejection, no response, or installation of a smart card regarding the warranty breach condition (Step 208).

If the user chooses the acceptance response, the reservoir is filled with the fluid from the replaceable fluid container. A message indicating a warranty breach is transmitted to the printhead. The message cannot be reset or erased (Step 208a). If the user chooses the rejection response or does not respond, the fluid flow to the reservoir from the replaceable fluid container is restricted (Step 208b or Step 208c).

If the user inserts a card that is readable with valid volumetric credits, the replaceable fluid container is filled with fluid (Step 408). The print station utilizes steps for validating warranty compliance for compatible fluid as depicted in FIG. 5.

Another method embodiment involves the smart card providing an expiration date of the fluid in the replacement container to the controller, wherein the controller is adapted to determine if an expiration date of the fluid has passed.

Figure 9:
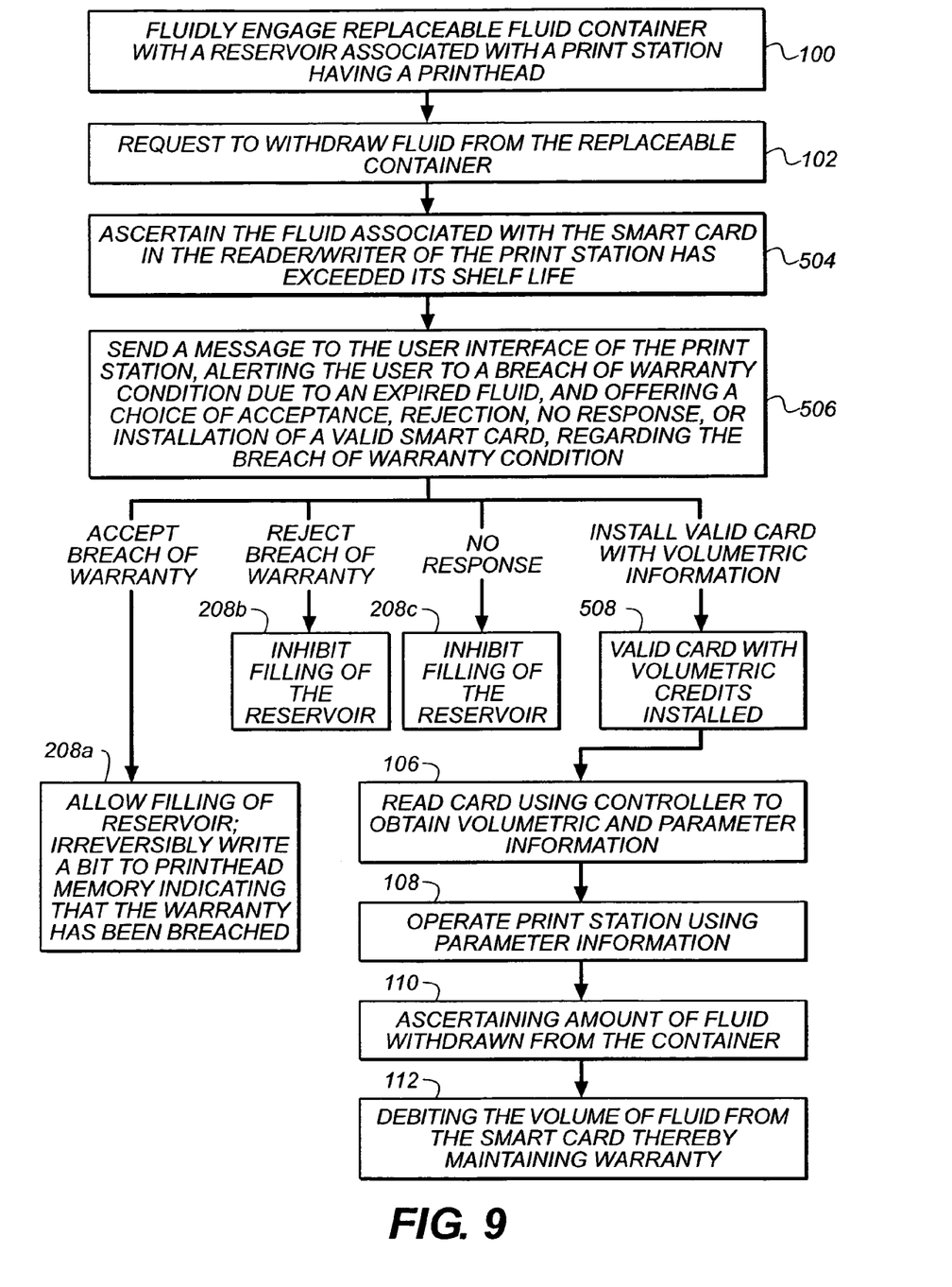
FIG. 9 depicts a flow cart of the sequence of steps in an embodied method for validating warranty compliance for compatible fluid use of a printing system.

FIG. 9 depicts an alternative embodiment, wherein the ink in the print system has passed an expiration date.

Once the print station has determined that the fluid in the replaceable fluid container has exceeded a shelf life (Step 504), the print station alerts the user through the user interface that warranty breach condition exists to the shelf life of the fluid being exceeded (Step 506). The print station presents the user at least the following four choices: acceptance, rejection, no response, or installation of a smart card regarding the warranty breach condition (Step 208).

If the acceptance choice is selected, reservoir is filled with fluid from the replaceable fluid container and a message indicating a warranty breach occurred is transmitted to the printhead (Step 208a). If the rejection choice is selected or if no response is given, the fluid flow to the reservoir from the replaceable fluid container is restricted (Step 208b or Step 208c).

If the user replaces the ink in the replaceable fluid container with a valid second smart card, the print station fills the reservoir with fluid from the replaceable fluid container. The print station installs the second smart card by reading the second smart card to obtain information related to the fluid (Step 106). The information includes volumetric information, fluid specific data, print station operation parameter information, and combinations thereof. The print station with the controller operates using the information obtained from the second smart card (Step 108). The print station ascertains if fluid has been withdrawn from the replaceable fluid container and, if so, the volumetric amount (Step 110). The reader/writer then debits the withdrawn fluid amount from the second smart card (Step 112), thereby maintaining printhead operation under warranty.

As an example, the smart card and smart card reader will function as follows: upon installation of an ink, the operator selects the ink number using the normal selection process from the controller. The smart card from the container is inserted into the fluid system's smart card reader. The fluid system periodically checks the smart card. If the ink does not match that on the system, a warning, such as "Incorrect Ink Attached", will be issued. If a smart card is not detected, a warning, such as "Ink Card Not Installed", will be issued.

The inkdex file for the ink in use will be stored on the smart card. During startup and whenever a new smart card has been installed, the system will check the version umber on the smart card's inkdex file and compare the version number to version number being run on the system. If the smart card version is more recent, the system will automatically transfer the smart card version onto the system processor board and reload the inkdex file. Other information will be stored on the smart card, such as "date of manufacture", "batch number", and "expiration date". If upon querying the smart card and system determines that the expiration date on the ink has passed, the system will issue a warning, such as Ink Shelf Life Expired".

A smart card serves as a secure memory on which the print station can track the usage of ink from the container. The smart card is distributed with each container of ink. Initially, a register on the smart card is set to an amount of ink corresponding to the size of the ink container. The initially set amount is known as the "volume register".

In the general embodiment, the smart card and smart card reader conform to ISO-78126 and are specifically chosen because the memory is secure in the following respects: (a) the smart card output cannot be emulated by another device; (b) the smart card cannot be "re-charged" (i.e., memory locations on the card cannot be written to the secure interface, since only the processor knows the encryption algorithm and keys); and (c) the smart card memory cannot be copied.

Additionally, the smart card memory is non-volatile and requires no external power for memory retention. In an alternative embodiment, any secure memory device can be used. The smart card embodiment uses variations algorithms to encrypt information, but one skilled in the art will recognize many algorithms and keys that can be used to secure code exchange.

Figure 10:
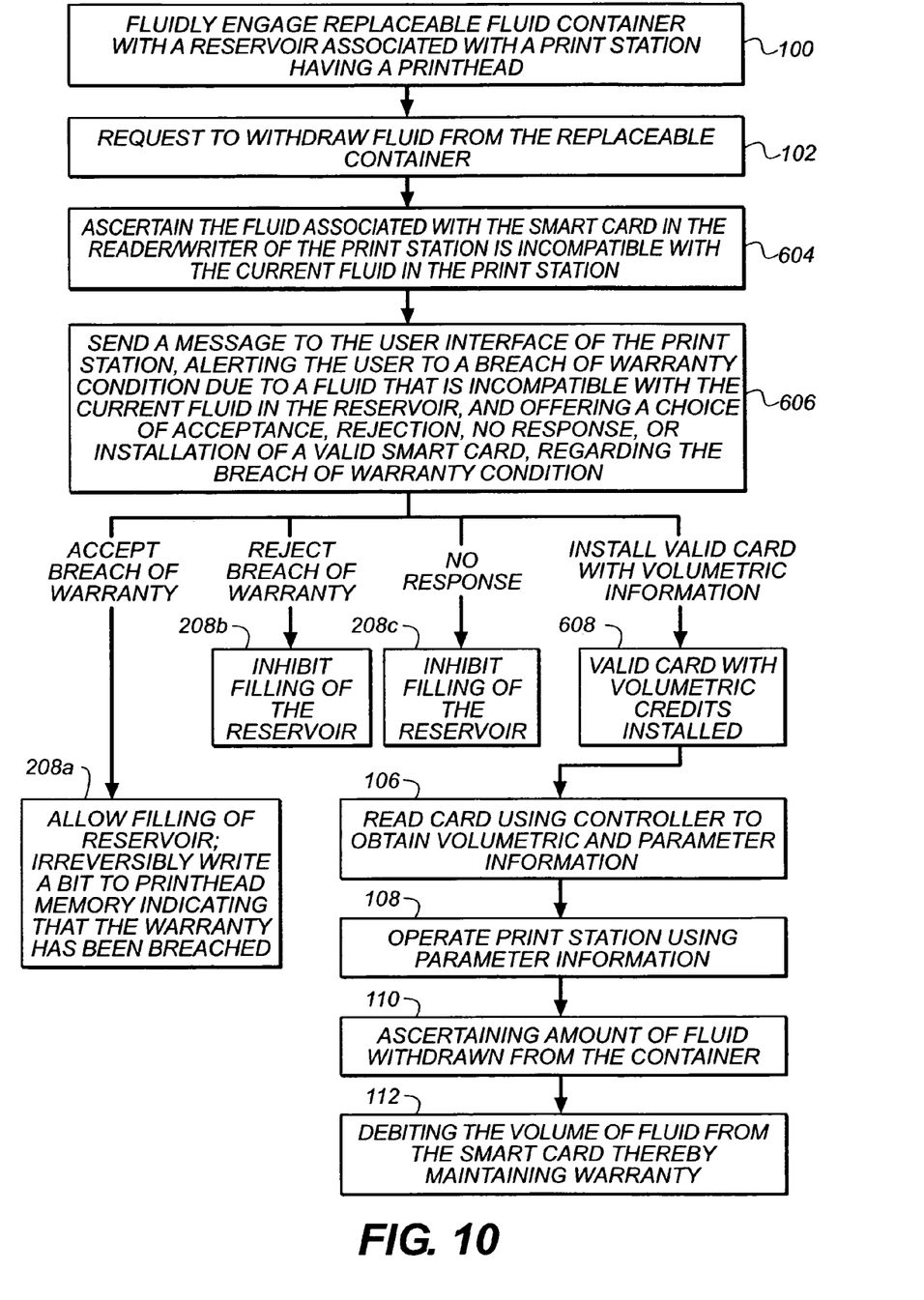
FIG. 10 depicts a flow cart of the sequence of steps in an embodied method for validating warranty compliance for compatible fluid use of a printing system.

FIG. 10 depicts an embodied method, wherein the fluid in the replaceable fluid container is not compatible with the fluid already present in the reservoir. The print station ascertains whether the fluid in the replaceable fluid container is compatible with the fluid in the print station by reading the information on the smart card (Step 604). The print head contains information about the fluid already present in the reservoir. The print station then compares the information on the smart card with the information about the current fluids. If the fluids are not compatible, the print station presents the user at least the following four choices: acceptance, rejection, no response, or installation of a smart card regarding the warranty breach condition (Step 208).

If the response is acceptance, the reservoir is filled with the fluid from the replaceable fluid container. The print station then transmits a message to the user through the user interface indicating that a warranty breach occurred. The message is also sent to the printhead and cannot be reset or erased (Step 208a). If no response is given or if the response is rejection, fluid from the replaceable fluid container is not allowed to flow to the reservoir (Step 208b and Step 208c).

If the user replaces the fluid in the replaceable fluid container with compatible fluid and inserts a valid second smart card, the print station allows the reservoir to be filled with the fluid from the replaceable fluid container (Step 608). The print station utilizes steps for validating warranty compliance for compatible fluid using a second smart card as depicted in FIG. 9.

The embodiments have been described in detail with particular reference to certain preferred embodiments thereof, but it will be understood that variations and modifications can be effected within the scope of the embodiments, especially to those skilled in the art.

PARTS LIST 10. print station
12. reservoir
13. fluid
14. fluid supply line
16. replaceable fluid container
17. replacement fluid
18. controllable valve
20. smart card
21. information
22. controller
24. reader/writer
26. flow meter
28. microchip
30. substrate
32. flash memory
34. random access memory (RAM)
36. microprocessor
38. communication link
40. non-card source
42. data—information about container
44. data—operating properties of fluid
46. data—reliability properties of fluid
48. data—specifications on the physical properties of fluid in container
50. data—volumetric measurements on fluid in container
52. data—batch expiration date
54. data—batch number 56. data—manufacturing plant identification number
58. data—customer name
60. data—customer address
62. data—authorization to charge based on amount printed
64. data—performance parameters
66. data—printhead information
68. security encryption algorithm
70. printhead
72. user interface
74. sensor
76. drop generator
78. orifice structure
80. jet array
81. charge device
82. catcher
84. fluid line
86. pump
88. fluid return line
100. step—fluidly engaging a replaceable fluid container associated with a print station with a smart card adapted to track volumetric credits
102. step—requesting to withdraw the fluid from the replaceable fluid container
104. step—ascertaining the presence of the smart card in the reader/writer
106. step—reading the smart card with the controller to obtain information related to the fluid
108. step—operating the print station with the controller and smart card using the print station operation parameter information
110. step—ascertaining a withdrawn fluid amount removed from the replaceable fluid container
112. step—writing the withdrawn fluid amount to the smart card from the controller using the reader/writer
204. step—ascertaining the absence of the smart card in the reader/writer
206. step—sending a message to a user interface on the print station alerting a user to a warranty breach condition due to the smart card being absent
208. step—offering a choice of acceptance, rejection, no response or installation of the smart card regarding the warranty breach condition
208a. step—if acceptance, filling the reservoir with fluid from the replaceable fluid container and transmitting a message to the printhead
208b. step—if rejection, restricting fluid to the reservoir
208c. step—if no response, restricting fluid to the reservoir
208d. step—if installation of the smart card with volumetric credits, filling the reservoir with fluid from the replaceable fluid container
304. step—ascertaining a zero volumetric credit on the smart card in the reader/writer
306. step—sending a message to a user interface on the print station alerting a user to a warranty breach condition due to the zero volumetric credit on the smart card
308. step—if installation of the smart card with volumetric credits, filling the reservoir with fluid from the replaceable fluid container
404. step—ascertaining that the smart card in the reader/writer is unreadable
406. step—sending a message to a user interface on the print station alerting a user to a warranty breach condition due to the smart card being unreadable
408. step—if installation of the smart card with volumetric credits that is readable by the reader/writer, filling the reservoir with fluid from the replaceable fluid container
504. step—ascertaining that the fluid of the replaceable fluid container exceeded a shelf life using the smart card
506. step—sending a message to a user interface on the print station alerting a user to a warranty breach condition due to the shelf life being exceeded
508. step—if installation of the second smart card, filling the reservoir with fluid from the replaceable fluid container
604. step—ascertaining that a replaceable fluid in the replaceable fluid container is incompatible with the fluid in the print station using the smart card in the reader/writer
606. step—sending a message to a user interface on the print station alerting a user to a warranty breach condition due to the fluid in the replaceable fluid is incompatible with the fluid in the print station
608. step—installation of a compatible fluid with a second smart card, filling the reservoir with fluid from the replaceable fluid container

What is claimed is:

1. A method for validating warranty compliance for compatible fluid use of a printing system, wherein the method comprises the steps of:
   a. fluidly engaging a replaceable fluid container with a reservoir associated with a print station having a printhead connected to the reservoir, wherein the replaceable fluid container is adapted to contain a fluid which is for filling the reservoir and which has a shelf life, wherein a controller is for controlling fluid flow from the replaceable fluid container to the reservoir, wherein a reader/writer is intended to have a smart card adapted to track volumetric credits relating to the fluid and is connected to the controller;
   b. requesting to withdraw the fluid from the replaceable fluid container;
   c. ascertaining a presence or absence of a warranty breach condition relating to the smart card and/or the fluid, which warranty breach condition can be either an absence of the smart card at the reader/writer, a zero volumetric credit on the smart card at the reader/writer, the smart card at the reader/writer cannot be read, the fluid in the replaceable fluid container has exceeded its shelf life, or the fluid is incompatible;
   d. sending a message to a user interface of the print station alerting a user to a presence of the warranty breach condition;
   e. offering a choice to the user of acceptance of the warranty breach condition, rejection of the warranty breach condition, no response, or installation of the smart card with volumetric credits at the reader/writer, wherein the choice results in of one of the following steps:
      i. if acceptance, filling the reservoir with the fluid from the replaceable fluid container and transmitting a message to the printhead that cannot be reset or erased indicating the warranty breach condition has occurred;
      ii. if rejection, restricting flow of the fluid to the reservoir to inhibit filling of the reservoir;
      iii. if no response, restricting flow of the fluid to the reservoir to inhibit filling of the reservoir;
      iv. if installation of the smart card with volumetric credits at the reader/writer, filling the reservoir with the fluid from the replaceable fluid container, wherein installation of the smart card with volumetric credits at the reader/writer includes the steps of:
         1. reading the smart card using the controller to obtain volumetric information and print station operation parameter information;

2. operating the print station with the controller and the smart card using the print station operation parameter information from the smart card;
3. ascertaining a withdrawn fluid amount removed from the replaceable fluid container; and
4. writing the withdrawn fluid amount to the smart card using the reader/writer so that the reader/writer debits the withdrawn fluid amount from the smart card in order to maintain operation of the printhead warranty.

2. The method of claim 1, wherein the step of requesting to withdraw the fluid is indicated when the fluid amount in the replaceable fluid container falls below a preset value.

3. The method of claim 1, wherein the step of requesting to withdraw fluid occurs when the print station is in a state that permits filling of the replaceable fluid container.

4. The method of claim 1, wherein an absence of the smart card is ascertained by determining if a communication link exists between the smart card and the controller.

5. The method of claim 1, wherein the step of ascertaining the withdrawn fluid amount removed from the replaceable fluid container is performed by the steps of
   a. using a flow totalizer on the replaceable fluid container, wherein the flow totalizer is in communication with the controller; and
   b. using a flow meter to measure a flow rate from the replaceable fluid container, wherein the flow meter is in communication with the controller, and wherein the controller integrates the flow rate over time to derive a total flow volume.

6. The method of claim 5, further comprising the step of ascertaining the withdrawn fluid amount using a float switch, a pressure transducers, ultrasonic measurement, or optic measurement.

7. The method of claim 1, wherein the steps of reading the smart card with the controller and of writing the withdrawn fluid amount to the smart card are encrypted.

8. The method of claim 1, further comprising the step of linking the print station and smart card to a web site to provide real time reports on a customer.

9. The method of claim 1, further comprising the step of initiating a customer service call to the customer when e the warranty breach condition occurs.

10. The method of claim 1, further comprising the step of providing a link from the smart card to a customer ordering site that enables fluid to be automatically refilled.

11. A method for validating warranty compliance for compatible fluid use of a printing system, comprising the steps of
   a. fluidly engaging a replaceable fluid container associated with a print station with a smart card adapted to track volumetric credits, wherein the replaceable fluid container contains fluid, and wherein the print station comprises: a printhead comprising a drop generator, a reservoir, an orifice structure and a catcher assembly; a controller connected to the printhead; and reader/writer for smart cards connected to the controller;
   b. requesting to withdraw the fluid from the replaceable fluid container;
   c. ascertaining the absence of the smart card in the reader/writer;
   d. sending a message to a user interface on the print station alerting a user to a warranty breach condition due to the smart card being absent;
   e. offering a choice of acceptance, rejection, no response or installation of the smart card regarding the warranty breach condition, wherein the choice results in of one of the following steps:
      i. if acceptance, filling the reservoir with fluid from the replaceable fluid container and transmitting a message to the printhead that cannot be reset or erased indicating a warranty breach occurred;
      ii. if rejection, restricting fluid to the reservoir;
      iii. if no response, restricting fluid to the reservoir;
      iv. if installation of the smart card with volumetric credits, filling the reservoir with fluid from the replaceable fluid container, wherein installing the smart card comprises the steps of:
         1. reading the smart card with the controller to obtain information related to the fluid, wherein the information comprises volumetric information, fluid specific data, print station operation parameter information, and combinations thereof;
         2. operating the print station with the controller and smart card using the print station operation parameter information;
         3. ascertaining a withdrawn fluid amount removed from the replaceable fluid container; and
         4. writing the withdrawn fluid amount to the smart card from the controller using the reader/writer, wherein the reader/writer debits the withdrawn fluid amount from the smart card, thereby maintaining printhead operation under warranty.

12. The method of claim 11, wherein the step of requesting to withdraw the fluid is indicated when the fluid amount in the replaceable fluid container falls below a preset value.

13. The method of claim 11, wherein the step of requesting to withdraw fluid occurs when the print station is in a state that permits filling of the replaceable fluid container.

14. The method of claim 11, wherein the step of ascertaining of the absence of the smart card is by determining if a communication link exists between the smart card and the controller.

15. The method of claim 11, wherein the step of ascertaining the withdrawn fluid amount removed from the replaceable fluid container is performed by the steps of
   a. using a flow totalizer on the replaceable fluid container, wherein the flow totalizer is in communication with the controller; and
   b. using a flow meter to measure a flow rate from the replaceable fluid container, wherein the flow meter is in communication with the controller, and wherein the controller integrates the flow rate over time to derive a total flow volume.

16. The method of claim 15, further comprising the step of ascertaining the withdrawn fluid amount using a float switch, a pressure transducers, ultrasonic measurement, or optic measurement.

17. The method of claim 11, wherein the steps of reading the smart card with the controller and of writing the withdrawn fluid amount to the smart card are encrypted.

18. The method of claim 11, further comprising the step of linking the print station and smart card to a website to provide real time reports on a customer.

19. The method of claim 11, further comprising the step of providing a link from the smart card to a customer ordering site that enables fluid to be automatically refilled upon notice of the warranty breach.

20. The method of claim 11, further comprising the step of providing a link from the smart card to a customer ordering site that enables fluid to be automatically refilled.

21. A method for validating warranty compliance for compatible fluid use of a printing system, comprising the steps of
   a. fluidly engaging a replaceable fluid container associated with a print station with a smart card adapted to track volumetric credits, wherein the replaceable fluid container contains fluid, and wherein the print station comprises: a printhead comprising a drop generator, a reservoir, an orifice structure and a catcher assembly; a controller connected to the printhead; and reader/writer for smart cards connected to the controller;
b. requesting to withdraw the fluid from the replaceable fluid container;
c. ascertaining a zero volumetric credit on the smart card in the reader/writer;
d. sending a message to a user interface on the print station alerting a user to a warranty breach condition due to the zero volumetric credit on the smart card;
e. offering a choice of acceptance, rejection, no response or installation of the smart card regarding the warranty breach condition, wherein the choice results in of one of the following steps:
  i. if acceptance, filling the reservoir with fluid from the replaceable fluid container and transmitting a message to the printhead that cannot be reset or erased indicating a warranty breach occurred;
  ii. if rejection, restricting fluid to the reservoir;
  iii. if no response, restricting fluid to the reservoir;
  iv. if installation of the smart card with volumetric credits, filling the reservoir with fluid from the replaceable fluid container, wherein installing the smart card comprises the steps of:
    1. reading the smart card with the controller to obtain information related to the fluid, wherein the information comprises volumetric information, fluid specific data, print station operation parameter information, and combinations thereof;
    2. operating the print station with the controller and smart card using the print station operation parameter information;
    3. ascertaining a withdrawn fluid amount removed from the replaceable fluid container; and
    4. writing the withdrawn fluid amount to the smart card from the controller using the reader/writer, wherein the reader/writer debits the withdrawn fluid amount from the smart card, thereby maintaining printhead operation under warranty.

22. The method of claim 21, wherein the step of requesting to withdraw the fluid is indicated when the fluid amount in the replaceable fluid container falls below a preset value.

23. The method of claim 21, wherein the step of requesting to withdraw fluid occurs when the print station is in a state that permits filling of the replaceable fluid container.

24. The method of claim 21, wherein the step of ascertaining the withdrawn fluid amount removed from the replaceable fluid container is performed by the steps of
a. using a flow totalizer on the replaceable fluid container, wherein the flow totalizer is in communication with the controller; and
b. using a flow meter to measure a flow rate from the replaceable fluid container, wherein the flow meter is in communication with the controller, and wherein the controller integrates the flow rate over time to derive a total flow volume.

25. The method of claim 24, further comprising the step of ascertaining the withdrawn fluid amount using a float switch, a pressure transducers, ultrasonic measurement, or optic measurement.

26. The method of claim 21, wherein the steps of reading the smart card with the controller and of writing the withdrawn fluid amount to the smart card are encrypted.

27. The method of claim 21, further comprising the step of linking the print station and smart card to a website to provide real time reports on a customer.

28. The method of claim 21, further comprising the step of providing a link from the smart card to a customer ordering site that enables fluid to be automatically refilled upon notice of the warranty breach.

29. The method of claim 21, further comprising the step of providing a link from the smart card to a customer ordering site that enables fluid to be automatically refilled.

30. A method for validating warranty compliance for compatible fluid use of a printing system, comprising the steps of
a. fluidly engaging a replaceable fluid container associated with a print station with a smart card adapted to track volumetric credits, wherein the replaceable fluid container contains fluid, and wherein the print station comprises: a printhead comprising a drop generator, a reservoir, an orifice structure and a catcher assembly; a controller connected to the printhead; and reader/writer for smart cards connected to the controller;
b. requesting to withdraw the fluid from the replaceable fluid container;
c. ascertaining that the smart card in the reader/writer is unreadable;
d. sending a message to a user interface on the print station alerting a user to a warranty breach condition due to the smart card being unreadable;
e. offering a choice of acceptance, rejection, no response or installation of the smart card regarding the warranty breach condition, wherein the choice results in of one of the following steps:
  i. if acceptance, filling the reservoir with fluid from the replaceable fluid container and transmitting a message to the printhead that cannot be reset or erased indicating a warranty breach occurred;
  ii. if rejection, restricting fluid to the reservoir;
  iii. if no response, restricting fluid to the reservoir;
  iv. if installation of the smart card with volumetric credits that is readable by the reader/writer, filling the reservoir with fluid from the replaceable fluid container, wherein installing the smart card comprises the steps of:
    1. reading the smart card with the controller to obtain information related to the fluid, wherein the information comprises volumetric information, fluid specific data, print station operation parameter information, and combinations thereof;
    2. operating the print station with the controller and smart card using the print station operation parameter information;
    3. ascertaining a withdrawn fluid amount removed from the replaceable fluid container; and
    4. writing the withdrawn fluid amount to the smart card from the controller using the reader/writer, wherein the reader/writer debits the withdrawn fluid amount from the smart card, thereby maintaining printhead operation under warranty.

31. The method of claim 30, wherein the step of requesting to withdraw the fluid is indicated when the fluid amount in the replaceable fluid container falls below a preset value.

32. The method of claim 30, wherein the step of requesting to withdraw fluid occurs when the print station is in a state that permits filling of the replaceable fluid container.

33. The method of claim 30, wherein the step of ascertaining the withdrawn fluid amount removed from the replaceable fluid container is performed by the steps of a. using a flow totalizer on the replaceable fluid container, wherein the flow totalizer is in communication with the controller; and
b. using a flow meter to measure a flow rate from the replaceable fluid container, wherein the flow meter is in communication with the controller, and wherein the controller integrates the flow rate over time to derive a total flow volume.

34. The method of claim 33, further comprising the step of ascertaining the withdrawn fluid amount using a float switch, a pressure transducers, ultrasonic measurement, or optic measurement.

35. The method of claim 30, wherein the steps of reading the smart card with the controller and of writing the withdrawn fluid amount to the smart card are encrypted.

36. The method of claim 30, further comprising the step of linking the print station and smart card to a web site to provide real time reports on a customer.

37. The method of claim 30, further comprising the step of providing a link from the smart card to a customer ordering site that enables fluid to be automatically refilled upon notice of the warranty breach.

38. The method of claim 30, further comprising the step of providing a link from the smart card to a customer ordering site that enables fluid to be automatically refilled.

39. A method for validating warranty compliance for compatible fluid use of a printing system, comprising the steps of
a. fluidly engaging a replaceable fluid container associated with a print station with a smart card adapted to track volumetric credits, wherein the replaceable fluid container contains fluid, and wherein the print station comprises: a printhead comprising a drop generator, a reservoir, an orifice structure and a catcher assembly; a controller connected to the printhead; and reader/writer for smart cards connected to the controller;
b. requesting to withdraw the fluid from the replaceable fluid container;
c. ascertaining that the fluid of the replaceable fluid container exceeded a shelf life using the smart card;
d. sending a message to a user interface on the print station alerting a user to a warranty breach condition due to the shelf life being exceeded;
e. offering a choice of acceptance, rejection, no response or installation of a second smart card regarding the warranty breach condition, wherein the choice results in of one of the following steps:
    i. if acceptance, filling the reservoir with fluid from the replaceable fluid container and transmitting a message to the printhead that cannot be reset or erased indicating a warranty breach occurred;
    ii. if rejection, restricting fluid to the reservoir;
    iii. if no response, restricting fluid to the reservoir;
    iv. if installation of the second smart card, filling the reservoir with fluid from the replaceable fluid container, wherein the installation of the second smart card comprises the steps of:
        1. reading the second smart card with the controller to obtain information related to the fluid, wherein the information comprises volumetric information, fluid specific data, print station operation parameter information, and combinations thereof;
        2. operating the print station with the controller and second smart card using the print station operation parameter information;
        3. ascertaining a withdrawn fluid amount removed from the replaceable fluid container; and
        4. writing the withdrawn fluid amount to the second smart card from the controller using the reader/writer, wherein the reader/writer debits the withdrawn fluid amount from the second smart card, thereby maintaining printhead operation under warranty.

40. The method of claim 39, wherein the step of requesting to withdraw the fluid is indicated when the fluid amount in the replaceable fluid container falls below a preset value.

41. The method of claim 39, wherein the step of requesting to withdraw fluid occurs when the print station is in a state that permits filling of the replaceable fluid container.

42. The method of claim 39, wherein the step of ascertaining of the presence of the second smart card is by determining if a communication link exists between the smart card and the controller.

43. The method of claim 39, wherein the step of ascertaining the withdrawn fluid amount removed from the replaceable fluid container is performed by the steps of
a. using a flow totalizer on the replaceable fluid container, wherein the flow totalizer is in communication with the controller; and
b. using a flow meter to measure a flow rate from the replaceable fluid container, wherein the flow meter is in communication with the controller, and wherein the controller integrates the flow rate over time to derive a total flow volume.

44. The method of claim 43, further comprising the step of ascertaining the withdrawn fluid amount using a float switch, a pressure transducers, ultrasonic measurement, or optic measurement.

45. The method of claim 39, wherein the steps of reading the second smart card with the controller and of writing the withdrawn fluid amount to the second smart card are encrypted.

46. The method of claim 39, further comprising the step of linking the print station and second smart card to a website to provide real time reports on a customer.

47. The method of claim 39, further comprising the step of initiating a customer service call to the customer when a warranty breach occurs.

48. The method of claim 39, further comprising the step of providing a link from the second smart card to a customer ordering site that enables fluid to be automatically refilled.

49. A method for validating warranty compliance for compatible fluid use of a printing system, comprising the steps of
a. fluidly engaging a replaceable fluid container associated with a print station with a smart card adapted to track volumetric credits, wherein the replaceable fluid container contains fluid, and wherein the print station comprises: a printhead comprising a drop generator, a reservoir, an orifice structure and a catcher assembly; a controller connected to the printhead; and reader/writer for smart cards connected to the controller;
b. requesting to withdraw the fluid from the replaceable fluid container;
c. ascertaining that a replaceable fluid in the replaceable fluid container is incompatible with the fluid in the print station using the smart card in the reader/writer;
d. sending a message to a user interface on the print station alerting a user to a warranty breach condition due to the fluid in the replaceable fluid is incompatible with the fluid in the print station;
e. offering a choice of acceptance, rejection, no response or installation of the smart card regarding the warranty breach condition, wherein the choice results in of one of the following steps:

i. if acceptance, filling the reservoir with fluid from the replaceable fluid container and transmitting a message to the printhead that cannot be reset or erased indicating a warranty breach occurred;

ii. if rejection, restricting fluid to the reservoir;

iii. if no response, restricting fluid to the reservoir;

iv. installation of a compatible fluid with a second smart card, filling the reservoir with fluid from the replaceable fluid container, wherein the installation of the second smart card comprises the steps of:

1. reading the second smart card with the controller to obtain information related to the fluid, wherein the information comprises volumetric information, fluid specific data, print station operation parameter information, and combinations thereof;

2. operating the print station with the controller and second smart card using the print station operation parameter information;

3. ascertaining a withdrawn fluid amount removed from the replaceable fluid container; and 4. writing the withdrawn fluid amount to the second smart card from the controller using the reader/writer, wherein the reader/writer debits the withdrawn fluid amount from the second smart card, thereby maintaining printhead operation under warranty.

50. The method of claim 49, wherein the step of requesting to withdraw the fluid is indicated when the fluid amount in the replaceable fluid container falls below a preset value.

51. The method of claim 49, wherein the step of requesting to withdraw fluid occurs when the print station is in a state that permits filling of the replaceable fluid container.

52. The method of claim 49, wherein the step of ascertaining of the presence of the second smart card is by determining if a communication link exists between the smart card and the controller.

53. The method of claim 49, wherein the step of ascertaining the withdrawn fluid amount removed from the replaceable fluid container is performed by the steps of a. using a flow totalizer on the replaceable fluid container, wherein the flow totalizer is in communication with the controller; and b. using a flow meter to measure a flow rate from the replaceable fluid container, wherein the flow meter is in communication with the controller, and wherein the controller integrates the flow rate over time to derive a total flow volume.

54. The method of claim 53, further comprising the step of ascertaining the withdrawn fluid amount using a float switch, a pressure transducers, ultrasonic measurement, or optic measurement.

55. The method of claim 49, wherein the steps of reading the second smart card with the controller and of writing the withdrawn fluid amount to the second smart card are encrypted.

56. The method of claim 49, further comprising the step of linking the print station and second smart card to a website to provide real time reports on a customer.

57. The method of claim 49, further comprising the step of initiating a customer service call to the customer when a warranty breach occurs.

58. The method of claim 49, further comprising the step of providing a link from the second smart card to a customer ordering site that enables fluid to be automatically refilled.

* * * * *